(12) United States Patent
Yarian

(10) Patent No.: US 6,801,866 B1
(45) Date of Patent: Oct. 5, 2004

(54) METHOD FOR MINIMIZING ERROR IN WEIGHING DEVICES

(76) Inventor: John C. Yarian, 15029 Portland Ave. South, Burnsville, MN (US) 55306

( * ) Notice: Subject to any disclaimer, the term of this patent is extended or adjusted under 35 U.S.C. 154(b) by 370 days.

(21) Appl. No.: 09/883,040

(22) Filed: Jun. 15, 2001

(51) Int. Cl.[7] .............................................. G01G 23/01
(52) U.S. Cl. ........................... 702/101; 177/50; 73/1.13
(58) Field of Search ........................... 177/50; 73/1.13; 702/101

(56) References Cited

U.S. PATENT DOCUMENTS 4,909,338 A * 3/1990 Vitunic et al. ................. 177/50

OTHER PUBLICATIONS

UKAS, Mar. 2001, "Calibration of Weighing Machines", Edition 1, 19 pages.*

* cited by examiner

Primary Examiner—Marc S. Hoff
Assistant Examiner—Paul Kim
(74) Attorney, Agent, or Firm—Haugen Law Firm PLLP

(57) ABSTRACT

A method for minimizing error in weight-measuring devices includes successively placing one or more standard test loads on the weighing device at a plurality of distinct testing positions located in about a peripheral of two-thirds of a weight-receiving surface of the weighing device, the loads being measured by the weighing device at discrete instances such that the testing positions are utilized individually to measure a selected load, determining the weight error displayed by the weighing device at each of the testing positions, summing the distinct measured weight errors into a summed error, and comparing such a summed error to a desired tolerance level, such that weighing devices exhibiting summed errors of excess of the tolerance level may be identified as being in need of corrective measures, including calibration.

15 Claims, 3 Drawing Sheets

METHOD FOR MINIMIZING ERROR IN WEIGHING DEVICES

FIELD OF THE INVENTION

The present invention relates to methods for testing weighing devices generally, and more particularly to methods for ensuring minimal error in weighing devices. The present invention further relates to methods for determining whether weighing device calibration is necessary.

BACKGROUND OF THE INVENTION

Weighing devices are currently utilized in a wide variety of applications, including various commercial applications. In many of such commercial applications, the weighing devices are utilized to determine price or cost of bulk products based on a given cost per unit of weight. Examples of such commercial applications include truck scales for measuring payload weights, hanging scales, shipping scales, weight classifiers, and bench or counter scales for determining weights of products such as pharmaceuticals, produce, or any other bulk merchandise sold on a per unit weight basis.

In many cases, the weight displayed by the weight-measuring scale corresponds directly to the price of the product whose weight is being determined. The product weight determination is typically conducted on a single measurement basis, such that variances in measurement or scale characteristics may be exacerbated. Further, systematic errors in the weighing process can adversely affect the seller or buyer of the measured product, depending upon which direction away from accuracy the systematic error presents in the weighing process. For example, a weighing device consistently displaying a weight less than actual weight results in reduced sale price and, consequently, reduced profits for the seller. Therefore, errors, whether random or systematic, are desirably minimized to reduce negative economic impact to both the seller and the buyer.

In a particular application of product weighing in the commercial setting is in the sale of grocery items at the checkout counter. In such an application, grocery items sold by unit weight are weighed at the checkout counter to determine the item price. Scales utilized at such checkout counters are typically of sufficient size to accommodate relatively large items, such that smaller items placed anywhere on the scale must also be accurately measured for their weight.

As discussed above, weighing devices reflecting measurement error adversely affect the seller or buyer, depending upon the measurement direction from zero error on the load applied. This condition is particularly exacerbated when multiple weighing devices are utilized at a particular place of business where more weighing devices than not are consistently measuring in a particular direction from zero error. In some instances, sophisticated sellers alter their scales to consistently measure a weight greater than what is accurate, such that the price charged to the buyer is correspondingly higher than the true price of the item. To counter such practices, governmental standards have been developed to periodically test weighing devices in a wide variety of commercial applications. Governmental agencies have been created to enforce such standards. In the case of a grocery store, governmental inspectors periodically test respective checkout counter scales by performing set testing procedures. Where weighing devices are determined to be nonconforming with stated governmental standards, various penalties may be assessed to the commercial proprietor.

As a safeguard procedure to prevent such penalties from being incurred, some proprietors employ testing procedures to ensure that their scales remain in compliance with governmental procedures. Typically, such testing professionals utilize those testing procedures developed by governmental agencies to ensure a minimal level of compliance with corresponding governmental standards. An example of a resource for determining appropriate governmental standards and testing procedures may be found in the National Institute of Standards and Technology (NIST) Handbook 44, which is produced by the United States Department of Commerce. The NIST Handbook 44 details test procedures and compliance standards for a variety of commercial weighing devices. The test procedures enumerated in the NIST Handbook 44 are intended to represent methods for determining minimal compliance with stated governmental standards.

To maintain their weighing devices in compliance with governmental standards, as well as to maintain a degree of accuracy, proprietors commonly utilize the NIST Handbook 44 test procedures. Because such test procedures are intended to provide only a minimal degree of compliance with stated governmental standards, it is desired to develop and utilize a testing method for minimizing error in weighing devices, which method provides an increase level of accuracy over published governmental test procedures.

It is therefore a principle object of the present invention to provide a method for minimizing error in weight-measuring devices such as scales.

It is a further object of the present invention to provide a test method for minimizing error in grocery checkout counter scale devices.

It is another object of the present invention to provide a reliable method for minimizing error in Class III scales.

It is a still further object of the present invention to provide a method for minimizing error in weighing devices, which method meets or exceeds the requirements set forth in the NIST Handbook 44.

It is a yet further object of the present invention to provide a test method utilizing a known weight of one-quarter to one-half of the scale capacity, which method minimizes the error in such a scale.

It is a still further object of the present invention to provide a method for determining whether weighing device calibration is necessary.

It is a still further object of the present invention to provide a test method for minimizing error in weighing devices, which method utilizes a sum of the errors technique to enhance determination of weighting device error.

SUMMARY OF THE INVENTION

By means of the present invention, an easy and efficient technique for minimizing the error in weighing devices is provided. Such a technique is achieved by successively placing a known weight at a plurality of distinct locations on a weight-receiving surface of the weighing device and determining a measurement error associated with each test location. The individual measurement errors are then added together to create a summed error, which summed error is compared to a desired tolerance level for the weighing device. The multiplicity of testing locations, along with summation of individual measurement errors provides an accurate depiction of weight measurement characteristics of a particular weighing device. Through such a method, various corrective measures may be undertaken in cases where the summed error exceeds the desired tolerance level, such that weighing devices may be screened for need of corrective actions on a relatively frequent basis, and at little expense to the weighing device operator.

One embodiment of the testing method of the present invention includes setting the weighing device at a zero point, successively placing one or more test loads on the weighing device at a plurality of distinct testing positions located in about a peripheral two-thirds of a weight-receiving surface of the weighing device, the loads being weighed by the weighing device at discrete instances such that the testing positions are utilized individually to measure a selected load. The user then determines the weight error displayed by the weighing device at each of the testing positions, sums the distinct measured weight errors into a summed error, and subsequently compares the summed error to a desired tolerance level, such that weighing devices exhibiting summed errors in excess of the tolerance level may be identified as being in need of calibration. Preferably, the distinct testing positions are substantially equidistant from one another, and distributed evenly about the weight-receiving surface. A common test load is preferably utilized at each of the testing positions wherein the test load is one-fourth to one-half of the designated weight capacity of the weighing device, and most preferably is one-third of the designated weight capacity of the weighing device. In preferred embodiments, the test loads are successively placed at least four distinct testing positions to determine device error at a weight range above capacity, thereby increasing accuracy of the test method. In some embodiments, the testing positions are located between a center point of the weight-receiving surface and respective outer corners of the weight-receiving surface.

Instances in which the summed error of a particular scale exceeds the designated tolerance level, the scale tester preferably conducts one or more of the following steps to perform a corrective action upon the scale: a) leveling the scale with leveling means, b) cleaning the scale, particularly under the weight-receiving surface of the scale, c) visually inspecting or passing a thin tool between the weight-receiving surface and the housing of the scale to ensure that the scale is free from obstructions which could impede its operational functions, and d) repairing or replacing broken or missing elements of the scale. A preferred method for calibrating a scale exceeding the designated tolerance levels includes utilizing a 2000 division weight range to thereby obtain the desired tolerance level, though a variety of weigh ranges may be employed in the calibration sequence.

DETAILED DESCRIPTION OF THE PREFERRED EMBODIMENTS

The objects and advantages enumerated above together with other objects, features, and advances represented by the present invention will now be presented in terms of detailed embodiments described with reference to the attached figures which are intended to be representative of various possible embodiments of the invention. Other embodiments and aspects of the invention are recognized as being within the grasp of those having ordinary skill in the art.

Figure 1:
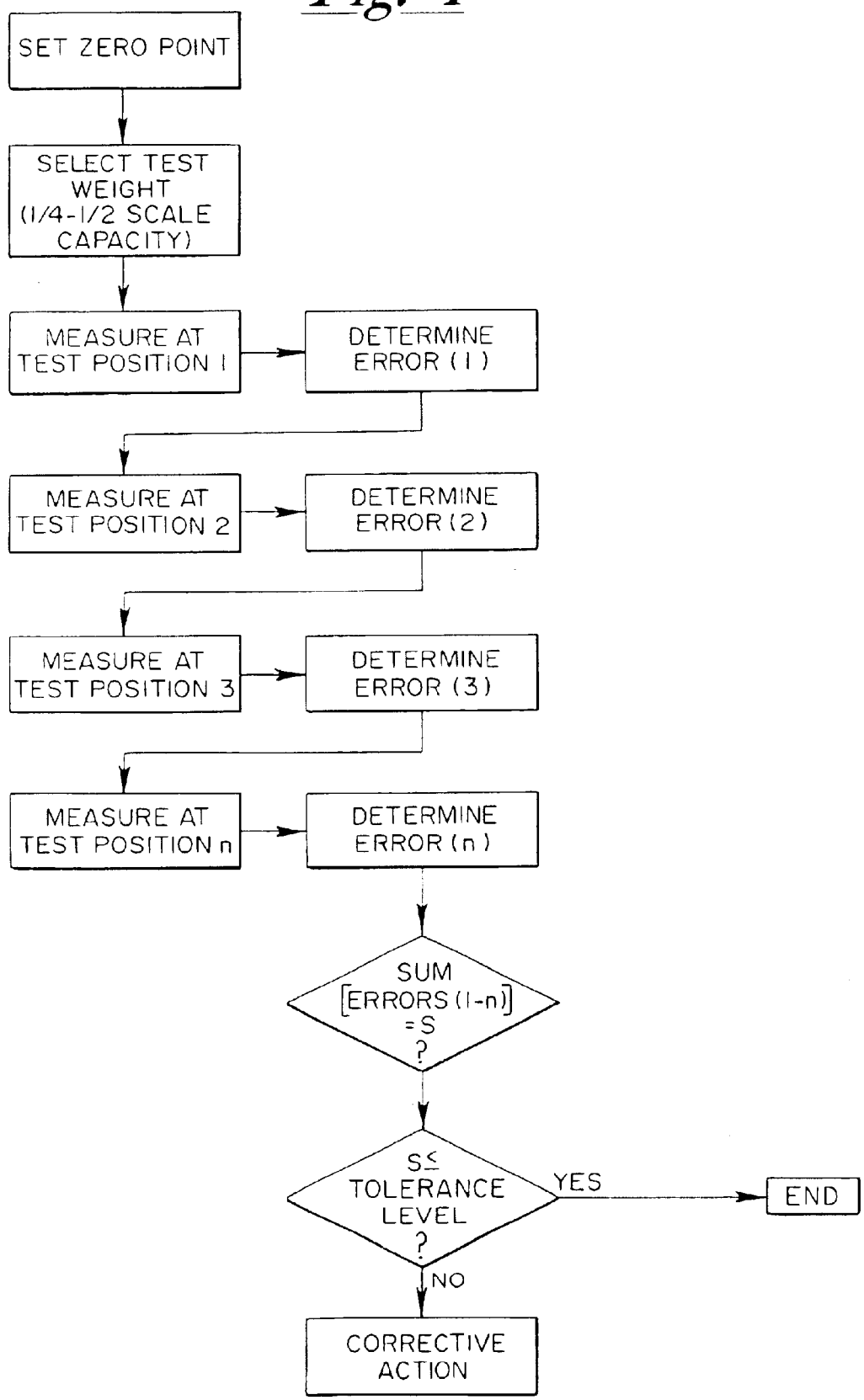
FIG. 1 is a flow diagram representing the testing method of the present invention.

Referring now by characters of reference to the drawings, and first to FIG. 1, a flow diagram detailing the steps embodying the present invention is shown. As illustrated in FIG. 1, the test method of the present invention is initiated by ensuring that the weighing device reads zero with no load on a weight receiving surface of the weighing device. If the weighing device does not initially read zero with no load thereon, the user preferably sets a zero point for reference thereto throughout the testing procedure. Once the weighing device has obtained a no load reading of zero, the tester selects a test load and a plurality of test positions on the weight-receiving surface of the weighing device at which the selected test load is successively placed during the test procedure of the present invention.

In preferred embodiments of the present invention, the selected test load is a standard weight of known quantity, with the test load being preferably one-fourth to one-half of the weight capacity of the respective weighing device. In some embodiments, the selected test load is preferably one-third of the weight capacity of the respective weighing device. The selected test load is preferably successively placed at a plurality of distinct test positions, at each of which test positions any differences between the actual weight of the selected test load and the weight displayed by the weighing device are recorded as error for that particular test position. Such an error recording process is repeated at each of the distinct test positions.

As illustrated in FIG. 1, the selected test load is placed at test position (1) for weighing device measurement thereof. Discrepancy between actual weight and weight displayed by the weighing device at test position (1) is then determined and recorded as error (1), which corresponds to the error at test position (1). Once the error is recorded, the test load is removed from test position (1) and placed at distinct test position (2) for weighing device measurement thereat. This process continues for each of the selected test positions.

In preferred embodiments, at least four of such test positions are included in the test procedure of the present invention, such that device error may be determined at weight ranges above capacity, thereby increasing accuracy of the test method. Upon determining the measured error at each selected test position, the errors are added together to obtain a summed error (S). Preferably, the numerical summed error is transposed into scale division units for comparison to a designated tolerance level, which tolerance level is typically stated in terms of scale division units. A scale division is defined as the value of the smallest subdivision or unit that can be indicated by the weighing device. For example, where a weighing device reads to thousandths of a gram (milligrams), one scale division is equal to one thousandth of a gram, or one milligram. Thus, if the summed error in such a weighing device was positive two milligrams, the summed error would correspond to positive two scale divisions. Units of scale divisions are typically used in the art for assessing error and tolerance levels.

The tolerance level to which the summed error is compared may be a governmentally-defined minimum standard, or may be a desired level of error within the boundaries defined by the governmental standards. In such a manner, weighing device owners may define tighter tolerance levels than those required by governmental entities. In some cases, tighter tolerance levels are put in place by proprietors to obtain desired levels of correspondence between measured weight and actual weight. In particular, proprietors may define tolerance levels within governmental standards which tolerance levels operate to minimize weighing device readings below actual weight, thereby minimizing loss in profits through sale of weighed goods.

As defined in the NIST Handbook 44, tolerance is defined as a performance requirement which fixes the limit of allowable error or departure from true performance or value. In a particular embodiment of the present invention, the tolerance level to which the summed errors are compared is between a positive two scale division and a negative error. In such an embodiment, a weighing device tested with the method of the present invention avoids corrective action only where the summed error is zero or greater and less than positive two scale divisions. Weighing devices reflecting a summed error exceeding the designated tolerance level requires corrective action, including calibration.

Figure 2:
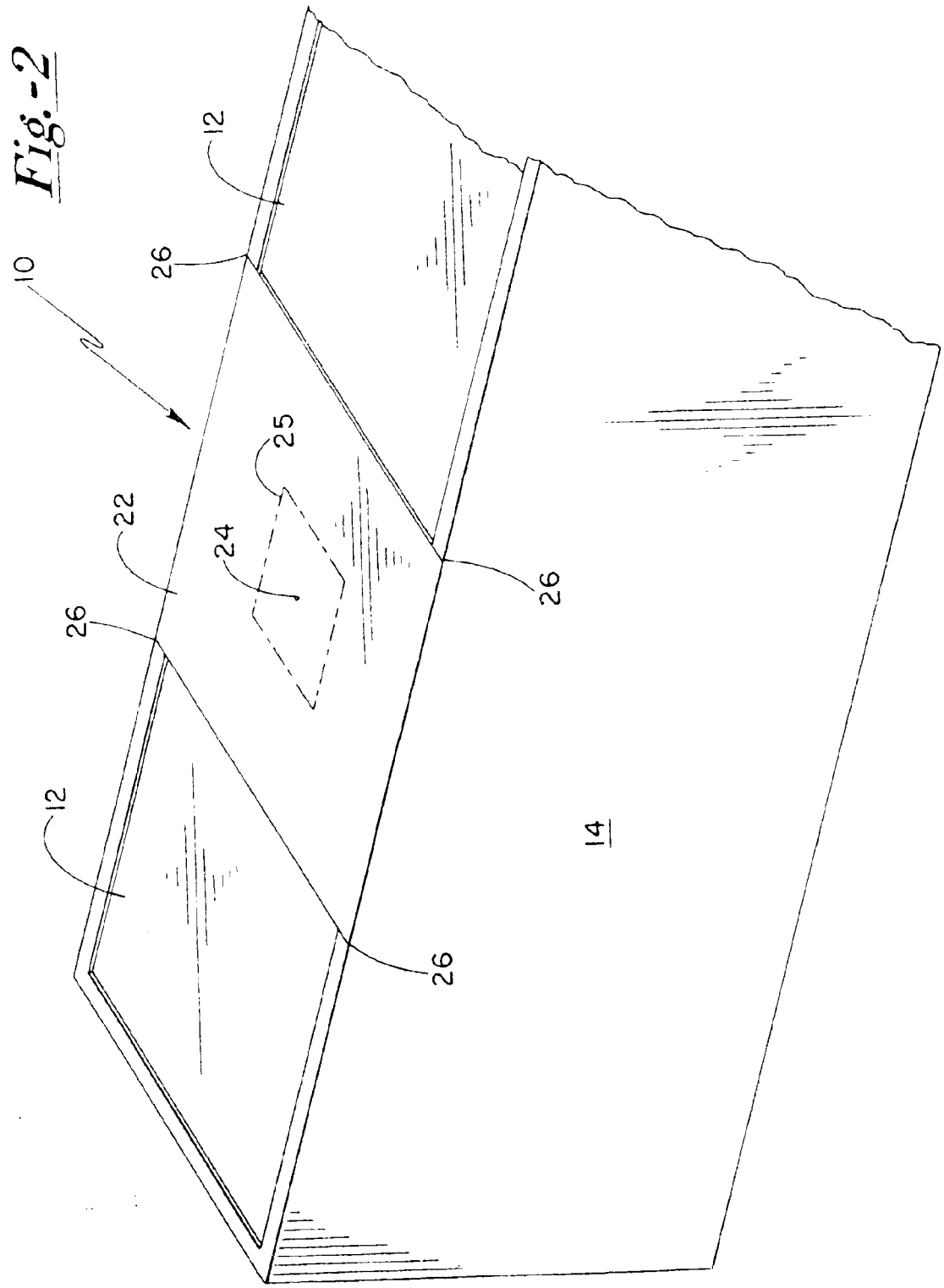
FIG. 2 is a perspective view of an exemplary embodiment of a scale apparatus which is contemplated to be tested by the method of the present invention.

In preferred embodiments of the present invention, the distinct testing positions are located in about a peripheral two-thirds of the weight-receiving surface of the weighing device. An example of such an embodiment is illustrated in FIG. 2, wherein weighing device 10 is incorporated in combination with a conveyor 12 of a checkout counter 14. As shown in FIG. 2, weighing device 10 is at least partially embedded in checkout counter 14, such that weight-receiving surface 22 of weighing device 10 is substantially parallel and in a plane with conveyor 12. Preferably, weight receiving surface 22 is substantially planar, and is preferably configured to provide an accurate weight measurement at any location thereof. For the purposes of the method of the present invention, however, the selected test weights are successively placed upon weight-receiving surface 22 at portions outside inner perimeter 25, which inner perimeter 25 defines the inner one-third area of weight-receiving surface 22. Placement of the test weights beyond inner perimeter is preferred for ensuring that product weight measurements are accurate at any portion of weight-receiving surface 22.

Preferably, the selected testing positions are equidistant from one another on weight-receiving surface 22, and represent an even test position distribution around inner perimeter. The test load utilized at such testing positions is preferably uniform at all positions. In other words, a one kilogram test load utilized at test position (1) is preferably utilized at each of the remaining selected test positions.

In the embodiments shown in FIG. 2, weighing device 10 is preferably a Class III scale, which is commonly used in a variety of weight-measuring applications, including grocery store checkout counters. In a particular embodiment of the present invention, four distinct testing positions are selected and located between a center point 24 of weight-receiving surface 22 and respective outer corners 26 of surface 22.

Figure 3:
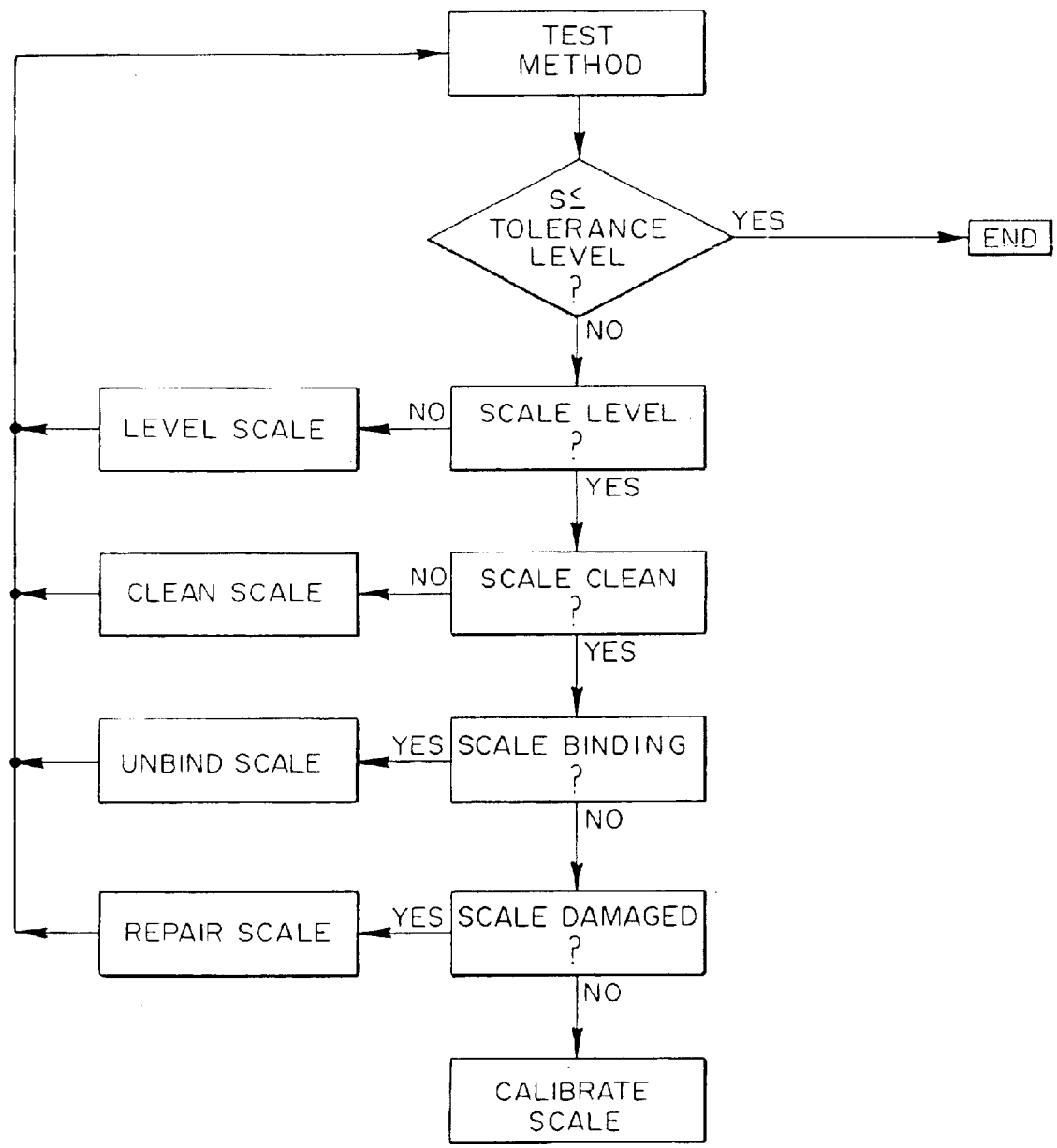
FIG. 3 is a schematic diagram illustrating alternative or cumulative corrective actions which may be taken to place the respective tested scale within the designated tolerance level.

FIG. 3 illustrates a corrective action procedure invoked as shown in FIG. 1. The corrective action taken may include a variety of actions, though the actions illustrated in the flow diagram of FIG. 3 are most preferred. Where the summed error obtained through the test procedure of the present invention exceeds the designated tolerance level, one or more corrective actions are desired before calibrating or repairing the scale. For instance, the tester may check the level of the weighing device, and whether the weighing device is clean and free of debris under weight-receiving surface 22. If problems with these conditions are detected, appropriate remedial action is desired, followed by a repeat of the test method of the present invention. Further, damage to the weighing device or binding of the weighing device is preferably checked and attended to where problems exist, and followed by a repeat of the test method of the present invention. When no problems are detected after the summed error exceeds the designated tolerance level, the weighing device is designated as in need of calibration or repair. In such a manner, weighing device operators may easily and efficiently determine whether respective weighing devices are in need of calibration or repair. In a particular embodiment, calibration of the weighing device involves a 2000 division weight range to obtain results within the desired tolerance level.

A number of distinct advantages are introduced by the test method of the present invention over currently utilized techniques. In particular, the method of the present invention provides an easy and efficient technique for quickly determining whether a particular weighing device is in need of corrective action, such as cleaning, repair, or calibration.

The method further allows a tester to project accuracy of the weighing device at higher weight ranges than those used in the testing procedure. The method of the present invention utilizes a sum of the errors technique, whereby offsetting random errors are accounted for while more precisely identifying systematic errors not detected by common single error comparison procedures. Procedures in use today call for placing individual selected weights at one or more designated locations, and comparing the error associated with each location individually to a governmental standard. The procedure of the present invention allows a tester to place the selected test load in a variety of locations around a weight-receiving surface of the weighing device to more effectively discover latent problems in the weighing process. Further, comparison of any desired tolerance level to a summed error figure from all of the designated test locations allows the weighing device operator to define desired tolerance levels, which may be substantially within governmental standards. In addition, the present invention allows the weighing device operator to perform cost-effective tests so as to ensure correctness of third party tests, comply with governmental maintenance requirements and to self-check weighing devices for compliance with desired tolerance levels.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A method for ensuring minimal error in weighing devices, comprising:

a) setting said weighing device at a zero point;

b) successively placing one or more standard test loads on said weighing device at a plurality of distinct testing positions located in about a peripheral two-thirds of a weight-receiving surface of said weighing device, said loads being measured by said weighing device at discrete instances such that said testing positions are utilized individually to measure a selected load;

c) determining a weight measuring error displayed by said weighing device at each of said testing positions;

d) summing said distinct displayed weight measuring errors into a summed error; and e) comparing said summed error to a desired tolerance level, such that weighing devices exhibiting summed errors in excess of said tolerance level may be identified as being in need of corrective action, including calibration.

2. A method as in claim 1 wherein said testing positions are substantially equidistant from one another, and distributed substantially evenly about said weight-receiving surface.

3. A method as in claim 1 wherein a common said selected test load is utilized at each of said testing positions.

4. A method as in claim 3 wherein said selected test load is one-fourth to one-half of the designated weight capacity of said weighing device.

5. A method as in claim 4 wherein said selected test load is one-third of the designated weight capacity of said weighing device.

6. A method as in claim 1 wherein said standard test loads are successively placed at at least four of said distinct testing positions.

7. A method as in claim 1 wherein said testing positions are located between a center point of said weight-receiving surface and respective outer corners of said weight-receiving surface.

8. A method as in claim 1 wherein said tolerance level is one-half of a standard maintenance tolerance.

9. A method as in claim 1 wherein said tolerance level is between a positive two scale division error and a negative error.

10. A method as in claim 1 wherein said weighing device is a Class III scale.

11. A method as in claim 1, including one or more of the steps consisting of:
 a) leveling said weighing device with leveling means;
 b) cleaning said weighing device, particularly under said weight-receiving surface of said weighing device;
 c) visually inspecting or passing a thin tool between said weight-receiving surface and a housing of said weighing device to ensure that said weighing device is free from obstructions which could impede its operational functions; and
 d) repairing or replacing broken or missing elements of said weighing device.

12. A method as in claim 1 wherein said calibration includes utilizing a 2000 division weight range to obtain a desired tolerance level.

13. A method for minimizing error in weighing devices, comprising:
 a) setting said weighing device at a zero point;
 b) successively placing one or more standard test loads on said weighing device at a plurality of distinct testing positions located in about a peripheral two-thirds of a weight-receiving surface of said weighing device, said loads being measured by said weighing device at discrete instances such that said testing positions are utilized individually to measure a selected load;
 c) determining a measurement error displayed by said weighing device at each of said testing positions;
 d) summing said displayed measurement errors into a summed error;
 e) comparing said summed error to a desired tolerance level, such that weighing devices exhibiting measurement errors in excess of said tolerance level undergo one or more corrective actions, said corrective actions being selected from one or more of the group consisting of:
  i) leveling said weighing device with leveling means;
  ii) cleaning said weighing device, particularly under said weight-receiving surface of said weighing device;
  iii) visually inspecting or passing a thin tool between said weight-receiving surface, and a housing of said weighing device to ensure that said weighing device is free from obstructions which could impede its operational functions; and
  iv) repairing or replacing broken or missing elements of said weighing device.

14. A method as in claim 13 wherein said testing positions are substantially equidistant from one another, and distributed substantially evenly about said weight-receiving surface.

15. A method as in claim 13 wherein said selected test load is one-fourth to one-half of the designated weight capacity of said weighing device.

* * * * *